(12) United States Patent
George

(10) Patent No.: US 8,797,773 B2
(45) Date of Patent: Aug. 5, 2014

(54) ISOLATED DC-DC CONVERTER INCLUDING ZVS FULL-BRIDGE AND CURRENT DOUBLER

(75) Inventor: Mark Steven George, Wilsonville, OR (US)

(73) Assignee: Cooper Technologies Company, Houston, TX (US)

( * ) Notice: Subject to any disclaimer, the term of this patent is extended or adjusted under 35 U.S.C. 154(b) by 755 days.

(21) Appl. No.: 12/871,386

(22) Filed: Aug. 30, 2010

(65) Prior Publication Data

US 2012/0051094 A1    Mar. 1, 2012

(51) Int. Cl.
*H02M 3/24*     (2006.01)
*H02M 3/335*    (2006.01)

(52) U.S. Cl.
USPC .............................................. 363/98; 363/17

(58) Field of Classification Search
CPC .................................................... H02M 3/3376
USPC .......... 363/15–17, 49, 55–56.05, 97, 98, 131, 363/132
See application file for complete search history.

(56) References Cited

U.S. PATENT DOCUMENTS

| | | | |
|---|---|---|---|
| 5,875,103 A | 2/1999 | Bhagwat et al. | |
| 5,963,442 A * | 10/1999 | Yoshida et al. | 363/98 |
| 6,016,258 A | 1/2000 | Jain et al. | |
| 6,356,462 B1 | 3/2002 | Jang et al. | |
| 6,392,902 B1 | 5/2002 | Jang et al. | |
| 6,396,722 B2 | 5/2002 | Lin | |
| 6,483,724 B1 | 11/2002 | Blair et al. | |
| 6,504,739 B2 | 1/2003 | Phadke | |
| 6,639,810 B2 * | 10/2003 | Shimizu et al. | 363/16 |
| 7,136,294 B2 | 11/2006 | Phadke et al. | |
| 8,526,201 B2 * | 9/2013 | Minami et al. | 363/17 |
| 2010/0165687 A1 * | 7/2010 | Higuchi | 363/132 |
| 2010/0213902 A1 * | 8/2010 | Oliveira et al. | 320/145 |

* cited by examiner

*Primary Examiner* — Matthew Nguyen
(74) *Attorney, Agent, or Firm* — Armstrong Teasdale LLP

(57) ABSTRACT

An isolated DC to DC converter including zero voltage switching and a current doubler. Current sensors are located between a positive input of the DC to DC converter and a current doubler is used in an output stage of the DC to DC converter in order to enable more accurate current sensing in a main transformer to prevent saturation of the transformer core and provide increased efficiency and power output with lower electromagnetic noise. The input of the DC to DC converter is isolated from the output of the DC to DC converter, and the DC to DC converter may be used in a hybrid or all-electric vehicle to provide an accessory bus from a power source of the vehicle.

30 Claims, 9 Drawing Sheets

US 8,797,773 B2

ISOLATED DC-DC CONVERTER INCLUDING ZVS FULL-BRIDGE AND CURRENT DOUBLER

BACKGROUND OF THE INVENTION

The field of the invention relates generally to DC to DC converters, and more specifically to DC to DC converters for use in electrical power systems, for example, in the power systems of hybrid or all-electric vehicles.

Direct current to Direct current (DC-DC or DC to DC) converters are used in hybrid vehicles or all electric vehicles to step down a voltage of a main battery to a voltage more commonly used in automotive electronics (e.g., 12-14.4 volts or 24-28 volts). Main batteries on hybrid or all-electric vehicles generally range from 200-400 volts. The relatively high voltage generally enables the batteries to store more energy from a power source and provide more energy to an electric motor of the vehicle with lower losses (e.g., heat loss) than if the battery were to store energy at 12 volts or 24 volts. These hybrid or all-electric vehicles typically include a 12 volt bus or 24 volt bus to provide compatibility with standard, widely available automotive electronics such as controllers, gauges, lights, and other accessories. It is desirable to provide reduced electromagnetic interference and improved power transfer in DC to DC converters to reduce interference with nearby electronics and increase energy efficiency. Such a DC to DC converter is useful in many applications including vehicles of all types and any other power systems requiring a DC to DC voltage conversion.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1A:
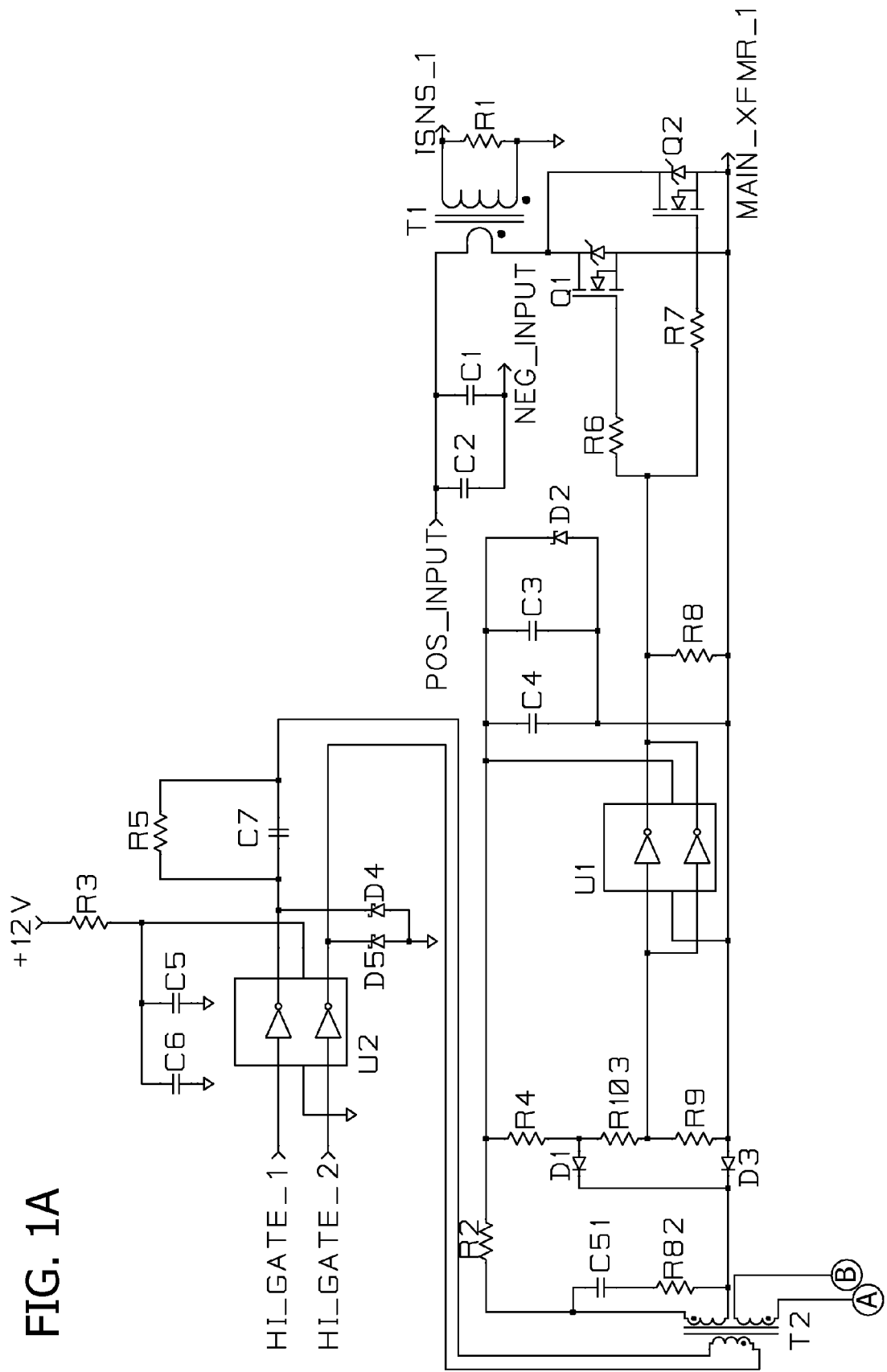
FIG. 1A is a schematic diagram of a switch buffer circuit and first high side switch of a DC to DC converter.

An isolated DC to DC converter including a full bridge zero voltage switching (ZVS) inverter and a current doubler output is disclosed herein. The DC to DC converter includes full bridge switching inverter or H bridge inverter driving a main transformer, an output stage receiving power from the main transformer, and a controller monitoring operation of the DC to DC converter (e.g., output voltage and current, input voltage and current, phase, etc.) and controlling the full bridge switching inverter as a function of said monitoring.

Generally, the full bridge inverter comprises a first high side switch, a second high side switch, a first low side switch, and a second low side switch selectively switched by the controller to provide an alternating current (AC) to a primary of the main transformer. The first high side switch is connected between a positive input of the DC to DC converter and a first terminal of the primary of the main transformer, and the first low side switch is connected between the negative or ground input of the DC to DC converter and the first terminal of the primary of the main transformer. The second high side switch is connected between the positive input of the DC to DC converter and a second terminal of the primary of the main transformer, and the second low side switch is connected between the negative or ground input of the DC to DC converter and the second terminal of the primary of the main transformer.

In operation, alternating current through the primary of the main transformer is achieved by alternatively turning on the first high side switch together with the second low side switch, or turning on the second high side switch together with the first low side switch. The controller monitors voltages and currents within the DC to DC converter and varies the timing and duration of the on and off time of each of the switches in order to control the output (i.e., voltage and current) of the DC to DC converter. Each of the first and second high side switches and the first and second low side switches has a capacitance across it (e.g., drain-source capacitance for a MOSFET based switch). Those capacitances together with a primary to secondary leakage inductance of the main transformer form a resonant circuit which is exploited to maximize power transfer efficiency from the input of the DC to DC converter to the output of the DC to DC converter and enable zero voltage switching to minimize switching losses. The output stage is attached across a secondary of the main transformer (i.e., to a first output and second output of the full bridge inverter). The transformer steps down the input voltage, and a rectifier of the output stage rectifies the AC signal to a DC signal. A current doubler arrangement within the output stage splits the output current between two inductive circuits to increase the capacity and efficiency of the DC to DC converter. The output stage also includes various filters and snubber circuits to protect the rectifier components, condition the output DC voltage, and reduce electromagnetic interference emissions.

Figure 1B:
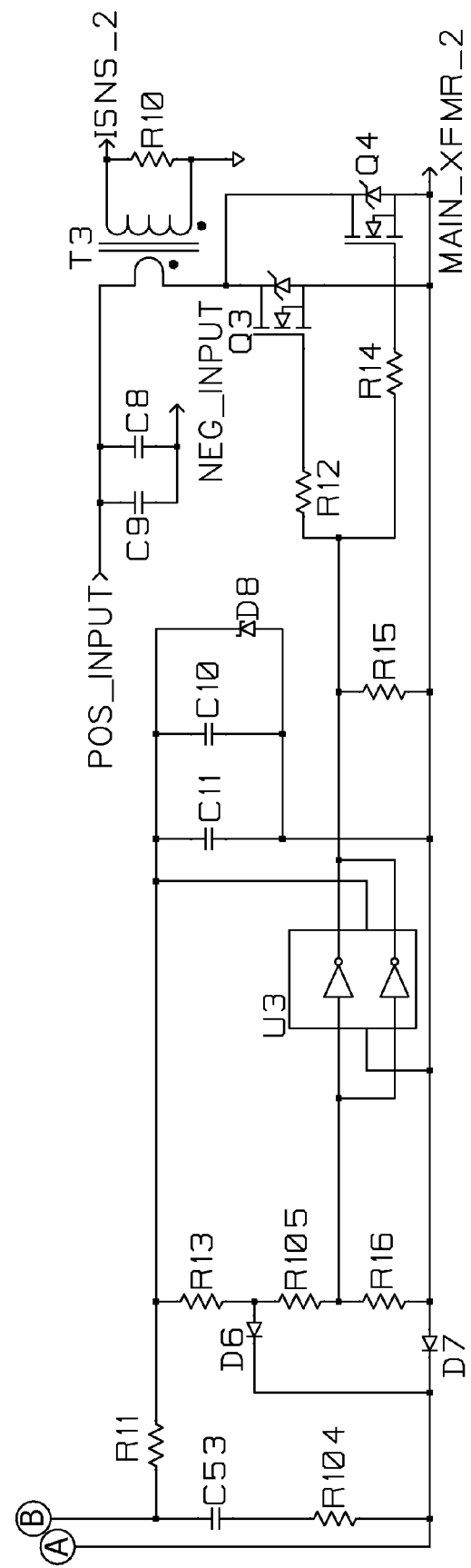
FIG. 1B is a schematic diagram of a second high side switch of the DC to DC converter of FIG. 1A.

Referring to FIGS. 1A and 1B, a DC to DC converter according to one embodiment of the invention comprises an input buffer to the first and second high side switches. The DC to DC converter includes small internal housekeeping supplies of 2.5, 5, and 12 volts produced by voltage regulators or other means commonly known in the art which are not shown.

The input buffer includes packaged amplifiers U2; capacitors C5, C6, and C7; resistors R3 and R5; Zener diodes D4 and D5; and transformer T2. A supply voltage input of the packaged amplifiers U2 is connected to the 12 volt housekeeping supply through resistor R3. Capacitors C5 and C6 are connected between the supply voltage input of the packaged amplifiers U2 and a circuit ground. A ground pin of the packaged amplifiers U2 is connected to the circuit ground. The packaged amplifiers U2 include a first and second amplifier, each of which include an input and an output. The input of the first amplifier of packaged amplifiers U2 receives a first high side switch gate signal from an application specific integrated circuit (ASIC) U7 (see FIG. 3B) for selectively turning the first high side switch on and off (i.e., switching between an on state wherein the switch is configured to conduct current and an off state wherein the switch does not conduct current). The input of the second amplifier of packaged amplifiers U2 receives a second high side switch gate signal from the ASIC U7. In one embodiment, the packaged amplifiers U2 are inverting amplifiers. The output of the first amplifier of packaged amplifiers U2 is connected to a first terminal of transformer T2 via capacitor C7. The cathode of Zener diode D4 is connected to the output of the first amplifier and the anode of Zener diode D4 is connected to circuit ground. The output of the second amplifier of packaged amplifiers U2 is connected to a second terminal of the transformer T2. The cathode of Zener diode D5 is connected to the output of the second amplifier of packaged amplifiers U2 and the anode of Zener diode D5 is connected to circuit ground. The transformer T2 comprises one primary winding and two secondary windings: an in phase winding and a reverse phase winding. The reverse phase winding drives the input of the first high side switch, and the in phase winding drives the input of the second high side switch.

Figure 4:
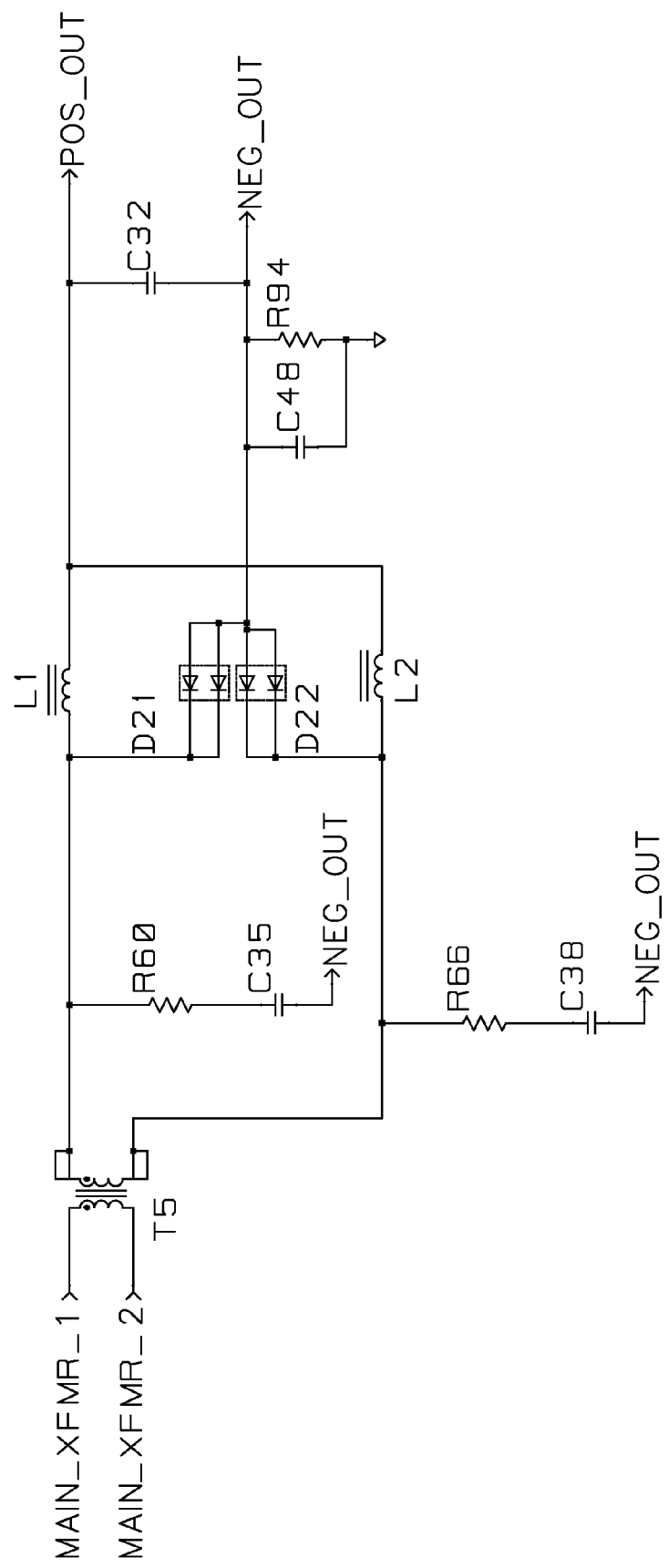
FIG. 4 is a schematic diagram of an output stage including a current doubler of the DC to DC converter of FIGS. 1A-3B.

The first high side switch is connected between the positive input (e.g., 300 volt main battery of a hybrid or all-electric vehicle) of the DC to DC converter and a first terminal of a primary winding of a main transformer T5 (see FIG. 4). The first high side switch includes an input buffer, and a plurality of switches connected in parallel (e.g., MOSFETs Q1 and Q2). The input buffer is connected across the two terminals of the reverse phase winding of the secondary of transformer T2. A diode D3 has a cathode connected to a first terminal of the reverse phase winding and an anode connected to a first terminal of the primary of main transformer T2. A capacitor C51 and a resistor R82 are connected in series between the first terminal of the reverse phase winding of the secondary of the transformer T2 and a second terminal of the reverse phase winding of the secondary of the transformer T2. A resistor R2 is connected in series with a capacitor C4 between the second terminal of the reverse phase winding of the secondary of the transformer T2 and the first terminal of the primary of the main transformer T5. A second capacitor C3 and a Zener diode D2 are each connected in parallel with capacitor C4. The anode of Zener diode D2 is connected to the first terminal of the primary of the main transformer T5. Packaged amplifiers U1 are connected in parallel with capacitor C4 to receive a bias voltage. Packaged amplifiers U1 include a plurality of inverting amplifiers connected in parallel. Resistors R4, R103, and R9 are connected in series across capacitor C4 to form a voltage divider network. A first side of resistor R4 is connected to the junction between R2 and C4, and a second side of resistor R4 is connected to the anode of a diode D1 and a first side of resistor R103. The cathode of the diode D1 is connected to the first terminal of the reverse phase winding of the secondary of transformer T2. An input of the packaged amplifiers U1 is connected to a junction between resistors R9 and R103, and an output of the packaged amplifiers U1 is connected to the first terminal of the primary of the main transformer T5 via a resistor R8. In one embodiment the plurality of switches connected in parallel includes a first n-channel MOSFET Q1 and a second n-channel MOSFET Q2 connected in parallel. The output of packaged amplifiers U1 is also connected to the gate of each MOSFET Q1 and Q2 via a respective resistor R6 and R7. The drain of each of the first and second MOSFETs Q1, Q2 is connected to a positive input of the DC to DC converter (e.g., a 300 volt main battery of a hybrid or all-electric vehicle). The source of each of the first and second MOSFETs Q1, Q2 is connected to the first terminal of the primary of the main transformer T5. Capacitors C1 and C2 are connected in parallel between the positive input of the DC to DC converter and a negative input of the DC to DC converter (e.g., a ground of the 300 volt main battery of the hybrid or all-electric vehicle).

FIG. 1A also includes a portion of a first current sensor of the DC to DC converter. The first current sensor includes a transformer T1 and a resistor R1. The primary of the transformer T1 is connected between the drain of the MOSFETs Q1, Q2 and the positive input of the DC to DC converter. The resistor R1 is connected across an in phase secondary winding of the transformer T1. A first terminal of the resistor R1 is connected to circuit ground, and a second terminal of the resistor R1 provides a first current signal indicative of a current entering the first high side switch. Connecting the transformer T1 between the drain of the high side switch and the input of the DC to DC converter increases the accuracy of the first current signal because the current sensor does not include gate drive current in the measurement of current through the high side switch. Thus, a more accurate indication of the actual current and magnetic flux through the main transformer T5 is provided. This helps to prevent saturation of the core of the main transformer T5 and thus premature failure of the DC to DC converter.

Referring to FIG. 1B, the second high side switch is similar in construction to the first high side switch. The second high side switch is connected between the positive input (e.g., 300 volt main battery of a hybrid or all-electric vehicle) of the DC to DC converter and a second terminal of the primary winding of the main transformer T5. The second high side switch includes an input buffer, and a plurality of switches connected in parallel (e.g., MOSFETs Q3 and Q4). The input buffer is connected across the two terminals of the in phase winding of the secondary of transformer T2. A diode D7 has a cathode connected to a first terminal of the in phase winding and an anode connected to a second terminal of the primary of main transformer T2. A capacitor C53 and a resistor R104 are connected in series between the first terminal of the in phase winding of the secondary of the transformer T2 and a second terminal of the in phase winding of the secondary of the transformer T2. A resistor R11 is connected in series with a capacitor C11 between the second terminal of the in phase winding of the secondary of the transformer T2 and the second terminal of the primary of the main transformer T5. A second capacitor C10 and a Zener diode D8 are each connected in parallel with capacitor C11. The anode of Zener diode D8 is connected to the second terminal of the primary of the main transformer T5. Packaged amplifiers U3 are connected in parallel with capacitor C11 to receive a bias voltage. Packaged amplifiers U3 include a plurality of inverting amplifiers connected in parallel. Resistors R13, R105, and R16 are connected in series across capacitor C11 to form a voltage divider network. A first side of resistor R13 is connected to the junction between R11 and C11, and a second side of resistor R13 is connected to the anode of a diode D6 and a first side of resistor R105. The cathode of the diode D6 is connected to the first terminal of the in phase winding of the secondary of transformer T2. An input of the packaged amplifiers U3 is connected to a junction between resistors R105 and R16, and an output of the packaged amplifiers U3 is connected to the second terminal of the primary of the main transformer T5 via a resistor R15. In one embodiment the plurality of switches connected in parallel includes a first n-channel MOSFET Q3 and a second n-channel MOSFET Q4 connected in parallel. The output of packaged amplifiers U3 is also connected to the gate of each MOSFET Q3 and Q4 via a respective resistor R12 and R14. The drain of each of the first and second MOSFETs Q3, Q4 is connected to the positive input of the DC to DC converter (e.g., a 300 volt main battery of a hybrid or all-electric vehicle). The source of each of the first and second MOSFETs Q3, Q4 is connected to the second terminal of the primary of the main transformer T5. Capacitors C8 and C9 are connected in parallel between the positive input of the DC to DC converter and the negative input of the DC to DC converter (e.g., a ground of the 300 volt main battery of the hybrid or all-electric vehicle).

FIG. 1B also includes a portion of a second current sensor of the DC to DC converter. The second current sensor includes a transformer T3 and a resistor R10. The primary of the transformer T3 is connected between the drain of the MOSFETs Q3, Q4 and the positive input of the DC to DC converter. The resistor R10 is connected across an in phase secondary winding of the transformer T3. A first terminal of the resistor R10 is connected to circuit ground, and a second terminal of the resistor R10 provides a second current signal indicative of a current entering the second high side switch.

Figure 2A:
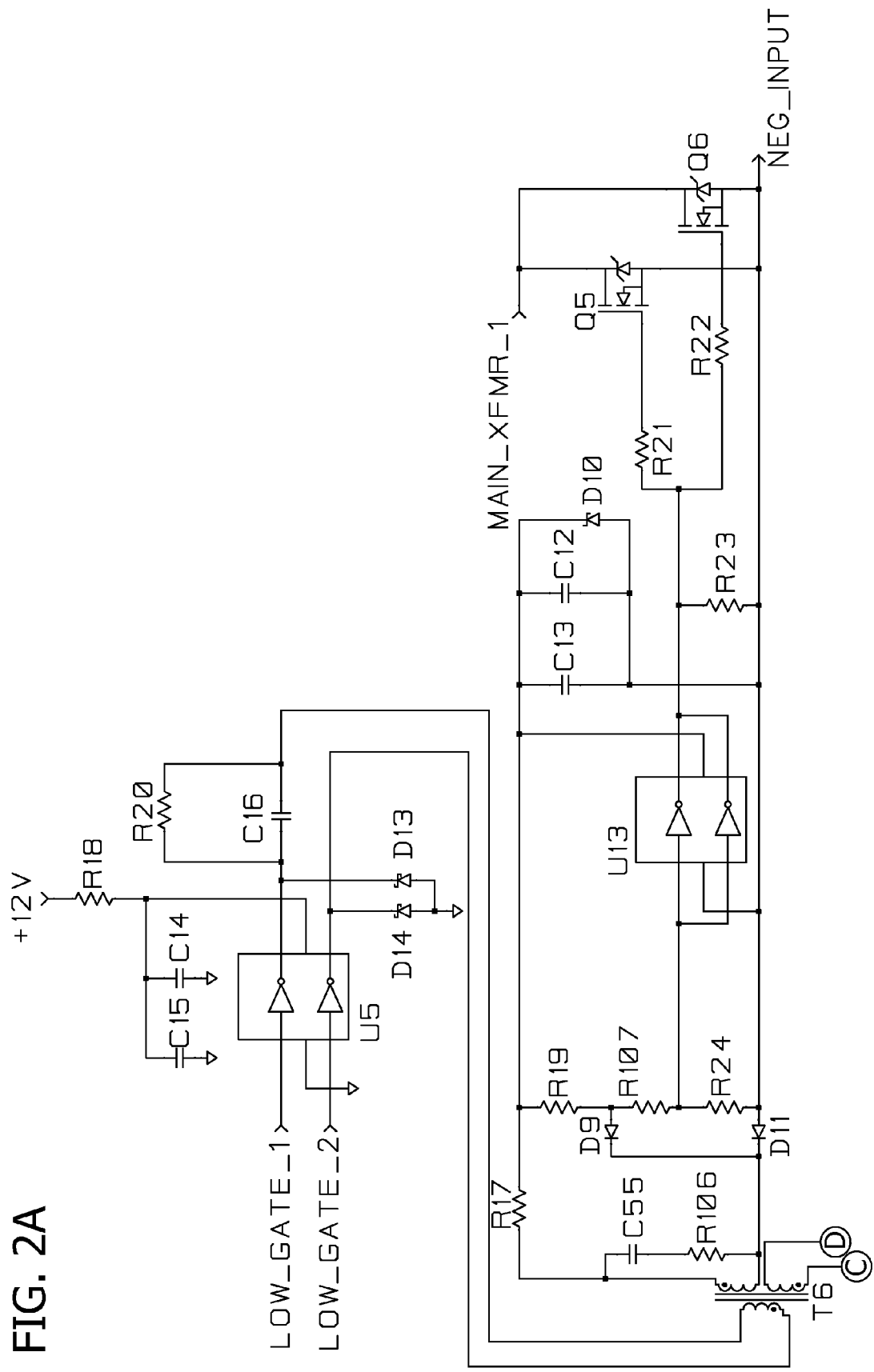
FIG. 2A is a schematic diagram of a second switch buffer circuit and first low side switch of the DC to DC converter of FIGS. 1A-1B.

Referring to FIG. 2A, an input buffer for the first and second low side switches and the first low side switch itself are shown. The input buffer includes packaged amplifiers U5; capacitors C14, C15, and C16; resistors R18 and R20; Zener diodes D13 and D14; and transformer T6. A supply voltage input of the packaged amplifiers U5 is connected to the 12 volt housekeeping supply through resistor R18. Capacitors C15 and C14 are connected between the supply voltage input of the packaged amplifiers U5 and the circuit ground. A ground pin of the packaged amplifiers U5 is connected to the circuit ground. The packaged amplifiers U5 include a first and second amplifier, each of which have an input and an output. The input of the first amplifier receives a first low side switch gate signal from the ASIC U7 (see FIG. 3B) for selectively turning the first low side switch on and off. The input of the second amplifier of the packaged amplifiers U5 receives a second low side switch gate signal from the ASIC U7 for selectively turning the first low side switch on and off. In one embodiment, the packaged amplifiers U5 are inverting amplifiers. The output of the first amplifier of the packaged amplifiers U5 is connected to a first terminal of transformer T6 via capacitor C16. The cathode of Zener diode D13 is connected to the output of the first amplifier of the packaged amplifiers U5 and the anode of Zener diode D13 is connected to circuit ground. The output of the second amplifier of the packaged amplifiers U5 is connected to a second terminal of the transformer T6. The cathode of Zener diode D14 is connected to the output of the second amplifier of the packaged amplifiers U5 and the anode of Zener diode D14 is connected to circuit ground. The transformer T6 comprises one primary winding and two secondary windings: an in phase winding and a reverse phase winding. The reverse phase winding drives the input of the first low side switch, and the in phase winding drives the input of the second low side switch.

The first low side switch is connected between the first terminal of the primary winding of the main transformer T5 and the negative input (e.g., the ground of the 300 volt main battery of a hybrid or all-electric vehicle) of the DC to DC converter. The first low side switch includes an input buffer, and a plurality of switches connected in parallel (e.g., MOSFETs Q5 and Q6). The input buffer is connected across the two terminals of the reverse phase winding of the secondary of transformer T6. A diode D11 has a cathode connected to a first terminal of the reverse phase winding and an anode connected to the negative input of the DC to DC converter. A capacitor C55 and a resistor R106 are connected in series between the first terminal of the reverse phase winding of the secondary of the transformer T6 and a second terminal of the reverse phase winding of the secondary of the transformer T6. A resistor R17 is connected in series with a capacitor C13 between the second terminal of the reverse phase winding of the secondary of the transformer T6 and the negative input of the DC to DC converter. A second capacitor C12 and a Zener diode D10 are each connected in parallel with capacitor C13. The anode of Zener diode D10 is connected to the negative input of the DC to DC converter. Packaged amplifiers U13 are connected in parallel with capacitor C13 to receive a bias voltage. Packaged amplifiers U13 include a plurality of inverting amplifiers connected in parallel. Resistors R19, R107, and R24 are connected in series across capacitor C13 to form a voltage divider network. A first side of resistor R19 is connected to the junction between R17 and C13, and a second side of resistor R19 is connected to the anode of a diode D9 and a first side of resistor R107. The cathode of diode D9 is connected to the first terminal of the reverse phase winding of the secondary of transformer T6. An input of the packaged amplifiers U13 is connected to a junction between resistors R107 and R24, and an output of the packaged amplifiers U13 is connected to the negative input of the DC to DC converter via a resistor R23. In one embodiment the plurality of switches connected in parallel includes a first n-channel MOSFET Q5 and a second n-channel MOSFET Q6 connected in parallel. The output of packaged amplifiers U13 is also connected to the gate of each MOSFET Q5 and Q6 via a respective resistor R21 and R23. The drain of each of the first and second MOSFETs Q5, Q6 is connected to the first terminal of the primary of the main transformer T5. The source of each of the first and second MOSFETs Q5, Q6 is connected to the negative input of the DC to DC converter.

Figure 2B:
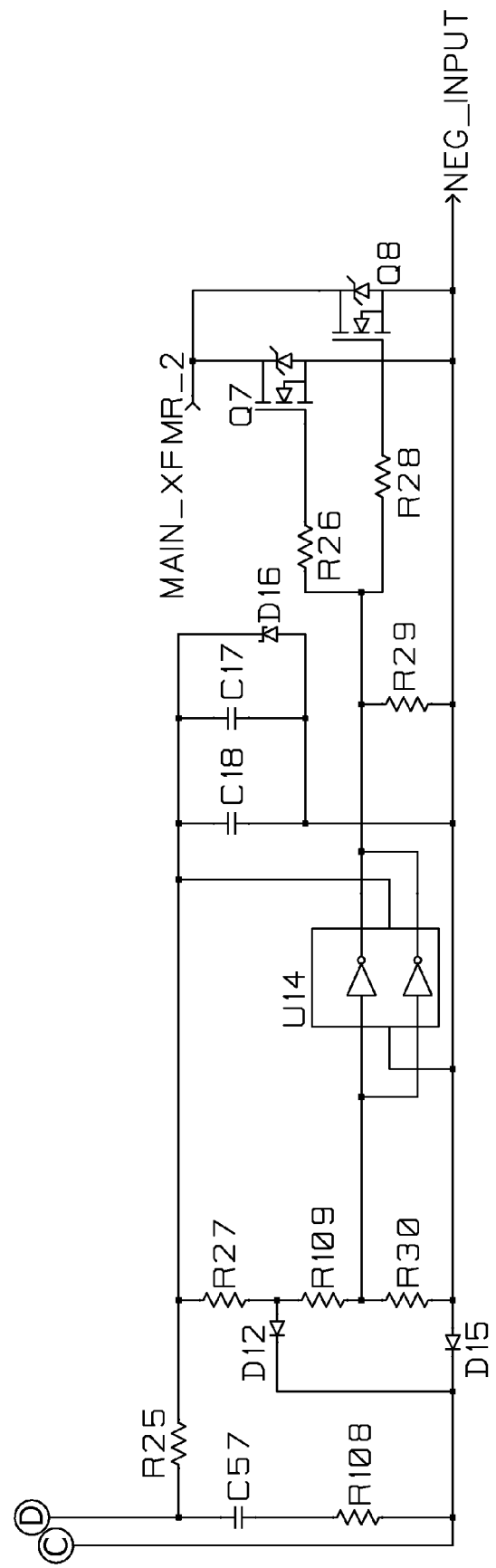
FIG. 2B is a schematic diagram of a second low side switch of the DC to DC converter of FIGS. 1A-2A.

Referring to FIG. 2B, the second low side switch is connected between the second terminal of the primary winding of the main transformer T5 and the negative input (e.g., the ground of the 300 volt main battery of a hybrid or all-electric vehicle) of the DC to DC converter. The second low side switch includes an input buffer, and a plurality of switches connected in parallel (e.g., MOSFETs Q7 and Q8). The input buffer is connected across the two terminals of the in phase winding of the secondary of transformer T6. A diode D15 has a cathode connected to a first terminal of the in phase winding and an anode connected to the negative input of the DC to DC converter. A capacitor C57 and a resistor R108 are connected in series between the first terminal of the in phase winding of the secondary of the transformer T6 and a second terminal of the in phase winding of the secondary of the transformer T6. A resistor R25 is connected in series with a capacitor C18 between the second terminal of the in phase winding of the secondary of the transformer T6 and the negative input of the DC to DC converter. A second capacitor C17 and a Zener diode D16 are each connected in parallel with capacitor C18. The anode of Zener diode D16 is connected to the negative input of the DC to DC converter. Packaged amplifiers U14 are connected in parallel with capacitor C18 to receive a bias voltage. Packaged amplifiers U14 include a plurality of inverting amplifiers connected in parallel. Resistors R27, R109, and R30 are connected in series across capacitor C18 to form a voltage divider network. A first side of resistor R27 is connected to the junction between resistor R25 and capacitor C18, and a second side of resistor R27 is connected to the anode of a diode D12 and a first side of resistor R109. The cathode of diode D12 is connected to the first terminal of the in phase winding of the secondary of transformer T6. An input of the packaged amplifiers U14 is connected to a junction between resistors R109 and R30, and an output of the packaged amplifiers U14 is connected to the negative input of the DC to DC converter via a resistor R29. In one embodiment the plurality of switches connected in parallel includes a first n-channel MOSFET Q7 and a second n-channel MOSFET Q8 connected in parallel. The output of packaged amplifiers U14 is also connected to the gate of each MOSFET Q7 and Q8 via a respective resistor R26 and R28. The drain of each of the first and second MOSFETs Q7, Q8 is connected to the second terminal of the primary of the main transformer T5. The source of each of the first and second MOSFETs Q7, Q8 is connected to the negative input of the DC to DC converter.

Figure 3A:
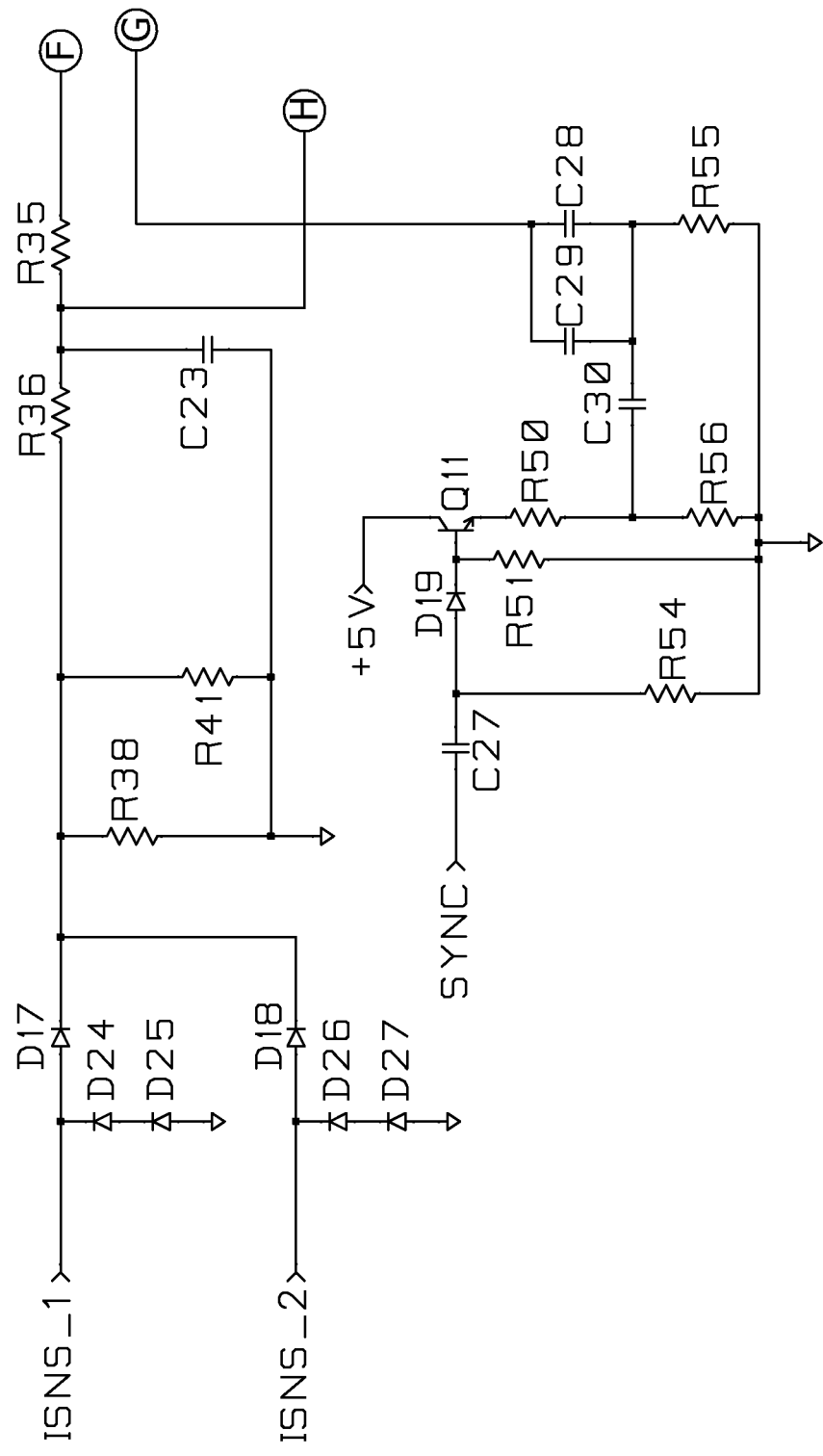
FIG. 3A is a schematic diagram of a current sensing circuit and sync circuit of the DC to DC converter of FIGS. 1A-2B.

Referring to FIG. 3A, a current sensing circuit receives the first and second current signals from the first and second current sensors positioned between each of the first and second high side switches and the positive input of the DC to DC converter and provides a third current signal to the controller of the DC to DC converter indicative of the total current provided from the positive input of the DC to DC converter to the full bridge inverter. It is contemplated that the current sensing circuit may be considered to be part of the controller of the DC to DC converter, or part of a current sensing circuit including the first and second current sensors. The first current signal is connected to the ASIC U7 (see FIG. 3B) via a diode D17, a resistor R36, and a resistor R35 connected in series. The first current signal is received at the anode of the diode D17, the cathode of diode D17 is connected to a first side of the resistor R36, and resistor R35 connects the second side of the resistor R36 to the ASIC U7 at a counter buffer input of the ASIC U7. Two diodes, D24 and D25 are connected in series between circuit ground and the anode of diode D17. The anode of diode D25 is connected to circuit ground, and the cathode of diode D24 is connected to the anode of diode D17. Two resistors, resistor R28 and resistor R41 are connected in parallel between the cathode of diode D17 and circuit ground. A capacitor C23 is connected between circuit ground and a junction formed at the connection of resistor R36 to resistor R35. The second current signal is received at the anode of a diode D18 whose cathode is connected to the cathode of the diode D17. Two diodes, diode D26 and diode D27, are connected in series between circuit ground and the anode of diode D18. The anode of diode D27 is connected to circuit ground, and the cathode of diode D26 is connected to the anode of diode D18. The second side of resistor R36 is also connected to a ramp and a cs input of the ASIC U7. Resistor R 48 and resistor R47 are connected in parallel between the ramp and the cs input of the ASIC U7 and circuit ground. The cs input is an input to an overcurrent comparator of the ASIC U7. The cs input is shorted to circuit ground upon termination of a pulse width modulated signal at an output of the ASIC U7. A resistor R46 and a capacitor C26 are connected in series across resistor R47.

FIG. 3A also includes a sync circuit for receiving a synchronization signal from a master controller (not shown) to control the phase of the full bridge inverter relative to a full bridge inverter of an optional second DC to DC converter (e.g., a second DC to DC converter identical to the DC to DC converter disclosed herein) connected in parallel with the DC to DC converter disclosed herein. The synchronization signal is received at a first side of a capacitor C27 of the synchronization circuit. A second side of the capacitor C27 is connected to circuit ground via a resistor R54. An NPN bipolar junction transistor includes a collector connected to the 5 volt housekeeping supply, a base connected to the cathode of a diode D19, and an emitter connected to circuit ground by a pair of series connected resistors, resistor R50 and resistor R56. The anode of diode D19 is connected to the second side of capacitor C27. A resistor R51 connects the cathode of diode D19 to circuit ground. A capacitor C30 and a resistor R55 are connected in series between a junction formed at the connection of resistor R50 to resistor R56 with the resistor R55 being connected to circuit ground. Two capacitors, capacitor C28 and capacitor C29 are connected in parallel between a junction formed at the connection between capacitor C30 and resistor R55 and a clock input of the ASIC U7.

Figure 3B:
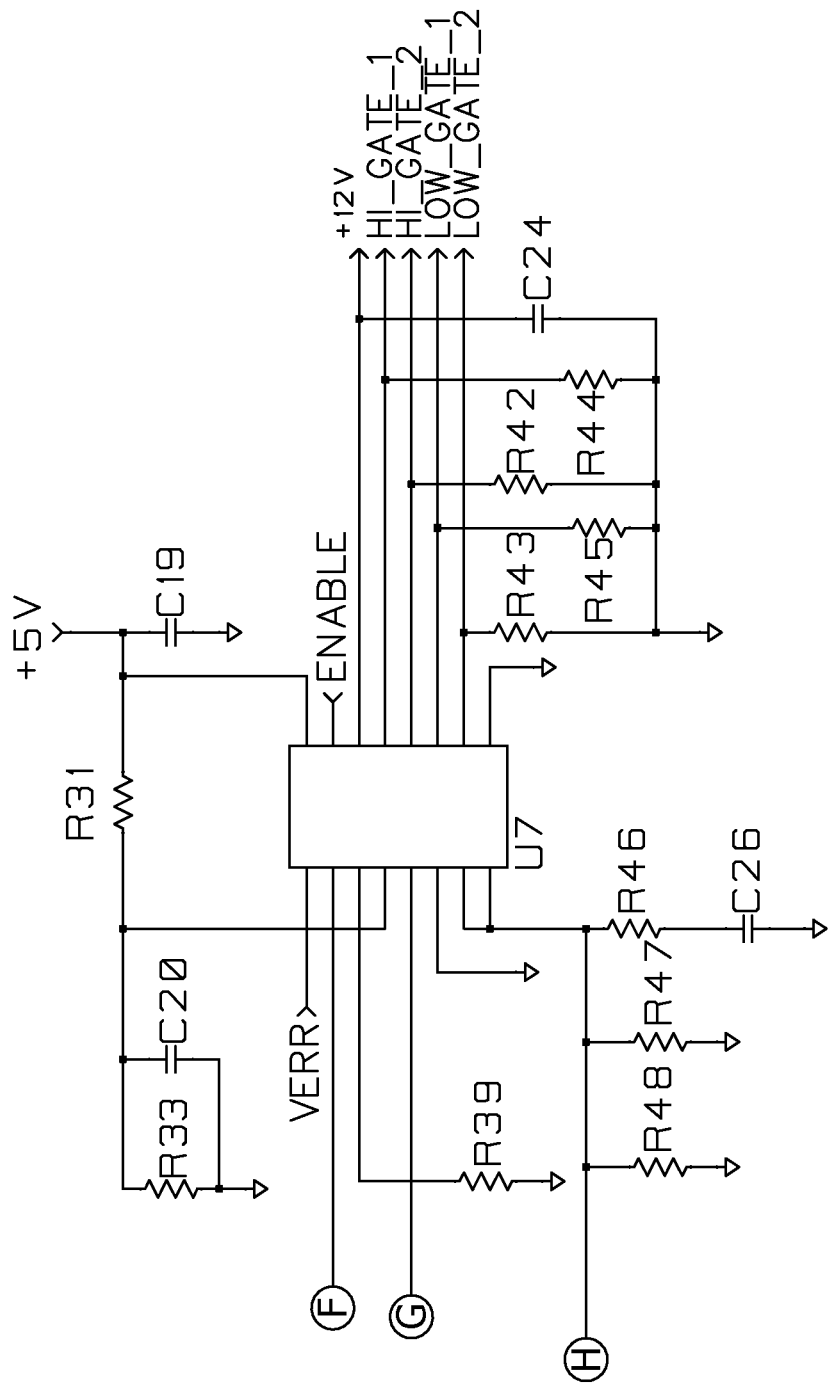
FIG. 3B is a schematic diagram of a controller of the DC to DC converter of FIGS. 1A-3A.

Referring to FIG. 3B, the controller of the DC to DC converter includes the ASIC U7. A voltage error input of the ASIC U7 receives a voltage error signal indicative of the difference between the desired output voltage the actual output voltage. The voltage error input is the non-inverting input of an error amplifier internal to the ASIC U7. The ASIC U7 alters the timing of the switching of the first and second high side switches and the first and second low side switches as a function of the received voltage error signal in order to adjust the output voltage of the DC to DC converter accordingly. In another embodiment employing a master controller and a plurality of DC to DC converters connected in parallel, the voltage error signal may be provided by the master controller to accomplish load balancing among the plurality of DC to DC converters. An RTD input of the ASIC U7 is connected to circuit ground via a resistor R39. A current flowing through the resistor R39 to circuit ground determines the magnitude of the current that discharges the clock input. In one embodiment, the magnitude of the current that discharges the clock input is 20 times the current through the resistor R39. A discharge duration of capacitor C28 determines a dead time of a pulse width modulated output of the ASIC U7. Capacitor In one embodiment, capacitor C28 is charged by a 200 microampere current source internal to ASIC U7 and discharged by a current source controlled via the RTD input. An FB input of the ASIC U7 is connected to circuit ground. The FB input of the ASIC U7 is an inverting input to an error amplifier internal to the ASIC U7 and the voltage error input which is the non-inverting input to the error amplifier internal to the ASIC U7. A capacitor C19 is connected between the 5 volt housekeeping supply and circuit ground, and a reference voltage input of the ASIC U7 is connected to the capacitor C19 at its connection to the 5 volt housekeeping supply. A resistor R33 is connected in series with the resistor R31 between the 5 volt housekeeping supply and circuit ground. A capacitor C20 is connected in parallel with resistor R33, and an RESDEL input of the ASIC U7 is connected at a junction formed at the connection between resistor R33 and resistor R31. An enable input of the ASIC U7 is optionally connected to the master controller to selectively enable and disable operation of the DC to DC converter. The enable input may also be connected to a thermal protection circuit for disabling the DC to DC converter if the temperature exceeds a predetermined limit (e.g., the temperature of the main transformer and/or the full bridge inverter switches). A bias voltage input of the ASIC U7 is connected to the 12 volt housekeeping supply and a capacitor C24 is connected between the bias voltage input and circuit ground. A ground terminal of the ASIC U7 is also connected to circuit ground.

In the embodiment, the ASIC U7 is a pulse width modulated zero voltage switched full bridge inverter controller such as an Intersil ISL6753AAZA. The ASIC U7 accomplishes zero voltage switching by initiating a pulse when the first or second current signal indicates that the current in the corresponding high side switch has reached its maximum. In the embodiment of FIGS. 1A-5, the ASIC U7 is used in a non-conventional way: the high side and low side switches are reversed. The first and second low side switches are operated at a fixed duty cycle, and the controller varies the duty cycle of the first and second high side switches. In one embodiment, the low side switches are operated at a fixed 50% duty cycle. In the embodiment shown in FIG. 3B, the ASIC U7 thus includes a first high side switch output providing the first low side switch gate signal to the low side switch input buffer, a second high side switch output providing the second low side switch gate signal to the low side switch input buffer, a first low side switch output providing the first high side switch gate signal to the high side switch input buffer, and a second low side switch output providing the second high side switch gate signal to the high side switch input buffer. A resistor R43 is connected between the second high side switch output and circuit ground, a resistor R45 is connected between the first high side switch output and circuit ground, a resistor R42 is connected between the second low side switch output and circuit ground, and a resistor R44 is connected between the first low side switch output and circuit ground. The ASIC U7 provides to each of the switches pulse train referenced to circuit ground, and the input buffers convert the circuit ground referenced pulse train to a floating pulse train. A voltage applied to the RESDEL input of the ASIC U7 sets the resonant delay period (i.e., the time between a toggle of the high side switches and the turn on of a low side switch). In one embodiment, varying the voltage at the RESDEL from 0 to 2 volts increases the resonant delay period respectively and proportionately from 0 to 100% of the dead time.

Referring to FIG. 4, an output stage including a current doubler is connected between a first output and a second output of the full bridge inverter (i.e., across the secondary of the main transformer T5). The main transformer T5 is a step down in phase transformer with a 5 to 1 reduction. The first output of the full bridge inverter is connected to the positive output of the DC to DC converter via a first inductor L1, and the second output of the full bridge inverter is connected to the positive output of the DC to DC converter via a second inductor L2. The inductors are matched and each provide half of any current provided by the DC to DC converter to a load attached between the positive output and a negative output of the DC to DC converter. A capacitor C32 is connected between the positive and negative outputs of the DC to DC converter. An electromagnetic interference filter comprising a capacitor C48 in parallel with a resistor R94 are connected between the negative output of the DC to DC converter and circuit ground. Anodes of a plurality of diodes connected in parallel D21 are connected to the negative output of the DC to DC converter, and the cathodes of the plurality of diodes connected in parallel are connected to the first output of the full bridge inverter. Anodes of a plurality of diodes connected in parallel D22 are connected to the negative output of the DC to DC converter, and the cathodes of the plurality of diodes connected in parallel D22 are connected to the second output of the full bridge inverter. The first output of the full bridge inverter is connected to the negative output of the DC to DC converter via a resistor R60 and a capacitor C35 connected in series which operate as a snubber circuit to protect diodes D21. The second output of the full bridge inverter is connected to the negative output of the DC to DC converter via a resistor R66 and a capacitor C38 connected in series which operate as a snubber circuit to protect diodes D22. The first inductor L1 and diodes D22 provide any output current from the DC to DC converter during half of each wave received from the full bridge inverter, and the second inductor and diodes D21 operate to provide any output current from the DC to DC converter during the other half of each wave received from the full bridge inverter, thus forming a current doubler or current doubling circuit. That is, the output stage including the current doubler can provide approximately twice as much current as an output stage employing a full wave rectifier and a large capacitance. In one embodiment, inductor L1, inductor L2, diodes D21, and diodes D22 are each capable of 50 amperes of current at 12 volts. The output stage including the current doubler also operates at a lower switching frequency, reducing the electromagnetic noise generated by the DC to DC converter.

Figure 5:
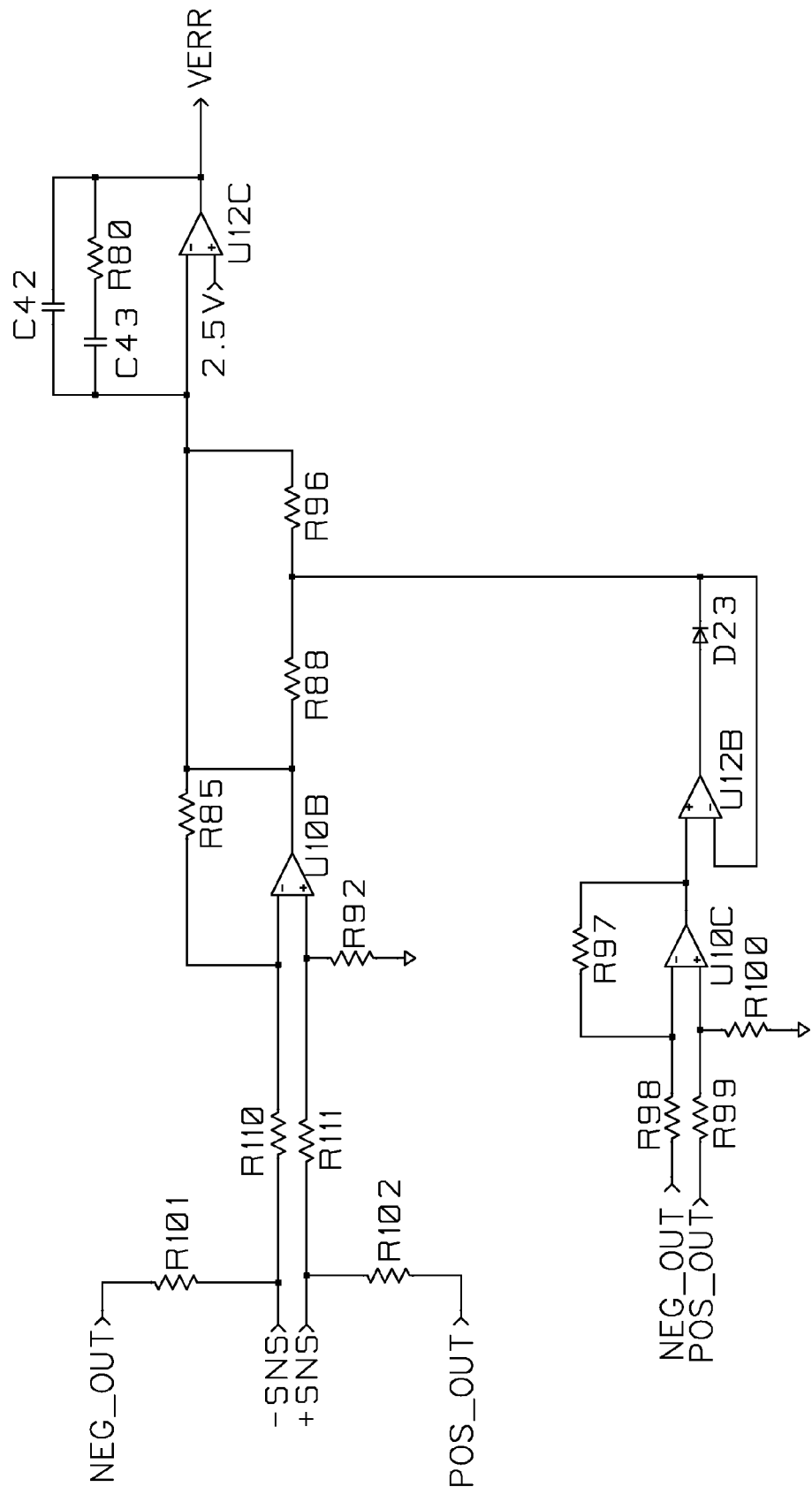
FIG. 5 is a schematic diagram of a voltage feedback circuit of the DC to DC converter of FIGS. 1A-4.

Referring to FIG. 5, a voltage sensing circuit is shown for providing the voltage error signal to the ASIC U7. The voltage sensing circuit includes four operational amplifiers (op amp): U10B, U10C, U12B, and U12C. The op amps U10B, U10C, U12B, and U12C receive a bias voltage from the 12 volt housekeeping supply and circuit ground. The inverting input of op amp U10B is connected to the negative output of the DC to DC converter via a resistor R110 and a resistor R101 connected in series. The non-inverting input of op amp U10B is connected to the positive output of the DC to DC converter via a resistor R111 and a resistor R102 connected in series. In one embodiment, a junction formed at the connection between resistor R101 and resistor R110 is connected to a negative input of a device powered by the DC to DC converter, and a junction formed at the connection between resistor R111 and resistor R102 is connected to a positive input of the device to detect the voltage at the device. The non-inverting input of op amp U10B is connected to circuit ground via resistor R92. The inverting input of op amp U10B is connected to the output of the op amp U10B via a resistor R85, forming a feedback loop. Altering the gain of op amp U10B adjusts the sensitivity of the voltage sensing circuit. The output of op amp U10B is connected to the inverting input of op amp U12C via resistor R88 and resistor R96 which are connected in series. The non-inverting input of op amp U12C is connected to a 2.5 volt reference voltage relative to circuit ground. The output of the op amp U12C provides the voltage error signal to the voltage error input of the ASIC U7. A capacitor 43 and a resistor R80 are connected in series between the output and the inverting input of op amp U12C, and a capacitor C42 is also connected between the output and the inverting input of op amp U12C. The inverting input of op amp U10C is connected to the negative output of the DC to DC converter via a resistor R98, and the non-inverting input of the op amp U10C is connected to the positive output of the DC to DC converter via a resistor R99. A resistor R100 is connected between the non-inverting input of the op amp U10C and circuit ground. A resistor R97 connects the output of the op amp U10C to the inverting input of the op amp U10C. The output of op amp U10C is connected to the non-inverting input of op amp U12B, and the inverting input of op amp U12B is connected to a junction formed at the connection between resistor R88 and resistor R96. The output of op amp U12B is also connected to the junction formed at the connection between resistor R88 and resistor R96 via a diode D23 whose anode is connected to the output of op amp U12B.

Figure 6:
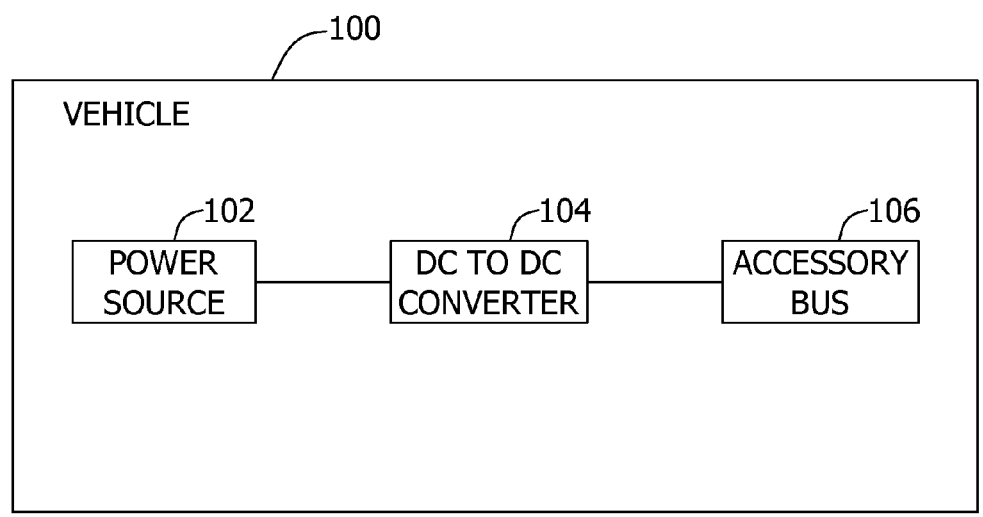
FIG. 6 is a block diagram of a hybrid or all-electric vehicle comprising the DC to DC converter of FIGS. 1A-5.

Referring to FIG. 6, a hybrid or all-electric vehicle 100 includes a power source 102, a DC to DC converter 104, and an accessory bus 106. The power source 102 is a main battery comprising, for example, an array of lithium ion cells operating at between 200 and 400 volts. The DC to DC converter 104 is, for example, the DC to DC converter disclosed in FIGS. 1A-5. The accessory bus 106 includes various devices operating at a reduced voltage, for example, about 12 or 24 volts. The DC to DC converter 104 receives power from the power source 102 and provides power at a reduced voltage to devices attached to the accessory bus 106. The input of the DC to DC converter is isolated from the output of the DC to DC converter such that the accessory bus 106 may be isolated from the power source 102.

It is contemplated that the vehicle of 100 may be any self propelled vehicle. For example, the vehicle 100 may be a truck, automobile, bus, recreational vehicle, boat, ship, airplane, helicopter, all terrain vehicle, motorcycle, or golf cart.

The vehicle 100 may also be a specialty vehicle such as a skid steer, forklift, mining vehicle, off highway dump truck, swing shovel, dragline, or locomotive. In one example, the DC to DC converter is used to transfer power from a 200-400 volt main battery of a delivery truck to a 12 volt or 24 volt bus of the delivery truck. The delivery truck uses the 200-400 volt main battery to store power and provide power to a traction motor which produces motive force for the delivery truck in addition to an engine of the truck. The 200-400 volt main battery may be charged by any or all of regenerative braking, a generator coupled to the engine of the delivery truck, and a power source external to the delivery truck.

It is also contemplated that the DC to DC converter may be used in a non-vehicle context. The DC to DC converter can transfer power from any power source to a load. For example, in a power plant, the DC to DC converter can transfer power from a first battery at one voltage to a second battery at another voltage, or to a load (e.g. an inverter). The DC to DC converter may be used to transfer power from a engine generator set working at one voltage to a load operating at another voltage.

It is contemplated that various components of the DC to DC converter of FIGS. 1A-5 may be implemented in various ways and considered part of different components than as described herein. For example, the first and second high side switches are described as including input buffers, but those components could be considered part of the input buffer without deviating from the scope of the invention disclosed herein. Alternatively, the controller may control the first and second high side switches without an intermediate buffer, or the buffers may be considered part of the controller. All of these permutations are considered within the scope of the invention disclosed herein.

The DC to DC converter disclosed in FIGS. 1A-5 employs galvanic isolation, isolating the output of the DC to DC converter from the input. That is, main transformer T5 and transformers T2, T1, T3, and T6 allow the full bridge inverter to operate with reference to the input of the DC to DC converter while the controller, voltage sensing circuit, current sensors, and output stage of the DC to DC converter operate referenced to the output of the DC to DC converter. In other words, there may be a potential difference between a ground of the output of the DC to DC converter and a ground of the input of the DC to DC converter. This is beneficial in, for example, hybrid or all-electric vehicles where there may be very large voltage transients in the ground or power source voltage due to switching of choppers or traction motors because such transients are not carried through to the control electronics attached to the relatively lower voltage output of the DC to DC converter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A DC to DC converter comprising:
    a full bridge inverter having a positive input, a negative input, a first output, and a second output, said full bridge inverter comprising a first high side switch, a second high side switch, a first low side switch, and a second low side switch, each of said switches having an on state and an off state wherein the switch will conduct current in the on state and will not conduct current in the off state;
    a current doubler connected between the first output and the second output of the full bridge inverter;
    a first current sensor connected between the positive input of the full bridge inverter and the first high side switch of the full bridge inverter, said first current sensor for providing a signal indicative of a current from a power source to the first high side switch; and
    a controller for receiving the signal indicative of the current from the power source to the first high side switch and selectively switching each of the first high side switch, second high side switch, first low side switch, and second low side switch between the on state and the off state as a function of said signal indicative of the current from the power source to the first high side switch.

2. The DC to DC converter of claim 1 further comprising a second current sensor connected between the second high side switch of the full bridge inverter and the positive input of the full bridge inverter for providing a signal indicative of a current from the power source to the second high side switch, wherein the controller is further configured to receive the signal indicative of the current from the power source to the second high side switch and selectively switch each of the first high side switch, second high side switch, first low side switch, and second low side switch between the on state and the off state as a function of said signal indicative of the current from the power source to the second high side switch.

3. The DC to DC converter of claim 1 wherein:
    the full bridge inverter further comprises a transformer comprising a primary and a secondary;
    the first output of the full bridge inverter is a first terminal of the secondary of the transformer;
    the second output of the full bridge inverter is a second terminal of the secondary of the transformer.

4. The DC to DC converter of claim 3 wherein the first high side switch, the second high side switch, the first low side switch, and the second low side switch are directly connected to the primary of the transformer.

5. The DC to DC converter of claim 1 wherein the current doubler comprises:
    a first inductor connected between the first output of the full bridge inverter and a positive output of the DC to DC converter;
    a second inductor connected in series with the first inductor across the output of the full bridge inverter;
    a first diode having an anode and a cathode, said anode connected to a negative output of the DC to DC converter and said cathode connected to a first output of the full bridge inverter; and
    a second diode having an anode and a cathode, said anode connected to the negative output of the DC to DC converter and said cathode connected to a second output of the full bridge inverter.

6. The DC to DC converter of claim 1 further comprising a thermal overload protection circuit for sensing a temperature of the transformer and causing the controller to disable the full bridge inverter, wherein the controller is connected to a positive output of the DC to DC converter and is configured to selectively switch each of the first high side switch, second high side switch, first low side switch, and second low side switch between the on state and the off state as a function of a voltage of the positive output of the DC to DC converter, said voltage of the positive output of the DC to DC converter being relative to a negative output of the DC to DC converter.

7. The DC to DC converter of claim 1 wherein the controller comprises a clock input for receiving a synchronization signal when the DC to DC converter is connected in parallel with a second DC to DC converter and selectively switching each of the first high side switch, second high side switch, first low side switch, and second low side switch between the on state and the off state as a function of the synchronization signal such that the switches are switched asynchronously with switches of the second DC to DC converter.

8. The DC to DC converter of claim 1 wherein:
the controller selectively switches each of the first low side switch and the second low side switch between the on state and the off state at a fixed duty cycle; and
the controller adjusts a duty cycle of the first high side switch and a duty cycle of the second high side switch to control the voltage at a positive output of the DC to DC converter.

9. The DC to DC converter of claim 1 wherein the controller selectively switches each of the first high side switch, the second high side switch, the first low side switch, and the second low side switch in a soft switching scheme.

10. The DC to DC converter of claim 9 wherein the soft switching scheme is based on zero voltage switching.

11. A hybrid or all-electric vehicle comprising:
a power source operating between about 250 volts and 400 volts;
an electrical system configured to operate at about 12 to 14 volts or 24 to 28 volts; and
a DC to DC converter connected to the power source and the electrical system, said DC to DC converter comprising:
a full bridge inverter having a positive input, a negative input, a first output, and a second output, said full bridge inverter comprising a first high side switch, a second high side switch, a first low side switch, and a second low side switch, each of said switches having an on state and an off state wherein the switch will conduct current in the on state and will not conduct current in the off state;
a current doubler connected between the first output and the second output of the full bridge inverter;
a first current sensor connected between the positive input of the full bridge inverter and the first high side switch of the full bridge inverter, said first current sensor for providing a signal indicative of a current from a power source to the first high side switch; and
a controller for receiving the signal indicative of the current from the power source to the first high side switch and selectively switching each of the first high side switch, second high side switch, first low side switch, and second low side switch between the on state and the off state as a function of said signal indicative of the current from the power source to the first high side switch.

12. The hybrid or all-electric vehicle of claim 11 further comprising a second current sensor connected between the second high side switch of the full bridge inverter and the positive input of the full bridge inverter for providing a signal indicative of a current from the power source to the second high side switch, wherein the controller is further configured to receive the signal indicative of the current from the power source to the second high side switch and selectively switch each of the first high side switch, second high side switch, first low side switch, and second low side switch between the on state and the off state as a function of said signal indicative of the current from the power source to the second high side switch.

13. The hybrid or all-electric vehicle of claim 11 wherein:
the full bridge inverter further comprises a transformer comprising a primary and a secondary;
the first output of the full bridge inverter is a first terminal of the secondary of the transformer;
the second output of the full bridge inverter is a second terminal of the secondary of the transformer.

14. The hybrid or all-electric vehicle of claim 13 wherein the first high side switch, the second high side switch, the first low side switch, and the second low side switch are directly connected to the primary of the transformer.

15. The hybrid or all-electric vehicle of claim 11 wherein the current doubler comprises:
a first inductor connected between the first output of the full bridge inverter and a positive output of the DC to DC converter;
a second inductor connected in series with the first inductor across the output of the full bridge inverter,
a first diode having an anode and a cathode, said anode connected to a negative output of the DC to DC converter and said cathode connected to a first output of the full bridge inverter; and
a second diode having an anode and a cathode, said anode connected to the negative output of the DC to DC converter and said cathode connected to a second output of the full bridge inverter.

16. The hybrid or all-electric vehicle of claim 11 further comprising a thermal overload protection circuit for sensing a temperature of the transformer and causing the controller to disable the full bridge inverter, wherein the controller is connected to a positive output of the DC to DC converter and is configured to selectively switch each of the first high side switch, second high side switch, first low side switch, and second low side switch between the on state and the off state as a function of a voltage of the positive output of the DC to DC converter, said voltage of the positive output of the DC to DC converter being relative to a negative output of the DC to DC converter.

17. The hybrid or all-electric vehicle of claim 11 wherein the controller comprises a clock input for receiving a synchronization signal when the DC to DC converter is connected in parallel with a second DC to DC converter and selectively switching each of the first high side switch, second high side switch, first low side switch, and second low side switch between the on state and the off state as a function of the synchronization signal such that the switches are switched asynchronously with switches of the second DC to DC converter.

18. The hybrid or all-electric vehicle of claim 11 wherein:
the controller selectively switches each of the first low side switch and the second low side switch between the on state and the off state at a fixed duty cycle; and
the controller adjusts a duty cycle of the first high side switch and a duty cycle of the second high side switch to control the voltage at a positive output of the DC to DC converter.

19. The hybrid or all-electric vehicle of claim 11 wherein the controller selectively switches each of the first high side switch, the second high side switch, the first low side switch, and the second low side switch in a soft switching scheme.

20. The hybrid or all-electric vehicle of claim 19 wherein the soft switching scheme is based on zero voltage switching.

21. A power system comprising:
a power source operating at a first voltage;
a load configured to operate at a second voltage different from the first voltage; and a DC to DC converter connected to the power source and the electrical system, said DC to DC converter comprising:
a full bridge inverter having a positive input, a negative input, a first output, and a second output, said full bridge inverter comprising a first high side switch, a second high side switch, a first low side switch, and a second low side switch, each of said switches having an on state and an off state wherein the switch will conduct current in the on state and will not conduct current in the off state;
a current doubler connected between the first output and the second output of the full bridge inverter;
a first current sensor connected between the positive input of the full bridge inverter and the first high side switch of the full bridge inverter, said first current sensor for providing a signal indicative of a current from a power source to the first high side switch; and
a controller for receiving the signal indicative of the current from the power source to the first high side switch and selectively switching each of the first high side switch, second high side switch, first low side switch, and second low side switch between the on state and the off state as a function of said signal indicative of the current from the power source to the first high side switch.

22. The power system of claim 21 further comprising a second current sensor connected between the second high side switch of the full bridge inverter and the positive input of the full bridge inverter for providing a signal indicative of a current from the power source to the second high side switch, wherein the controller is further configured to receive the signal indicative of the current from the power source to the second high side switch and selectively switch each of the first high side switch, second high side switch, first low side switch, and second low side switch between the on state and the off state as a function of said signal indicative of the current from the power source to the second high side switch.

23. The power system of claim 21 wherein:
the full bridge inverter further comprises a transformer comprising a primary and a secondary;
the first output of the full bridge inverter is a first terminal of the secondary of the transformer;
the second output of the full bridge inverter is a second terminal of the secondary of the transformer; and
the power system is the power system of a hybrid vehicle.

24. The power system of claim 23 wherein the first high side switch, the second high side switch, the first low side switch, and the second low side switch are directly connected to the primary of the transformer.

25. The power system of claim 21 wherein the current doubler comprises:

a first inductor connected between the first output of the full bridge inverter and a positive output of the DC to DC converter;
a second inductor connected in series with the first inductor across the output of the full bridge inverter,
a first diode having an anode and a cathode, said anode connected to a negative output of the DC to DC converter and said cathode connected to a first output of the full bridge inverter; and
a second diode having an anode and a cathode, said anode connected to the negative output of the DC to DC converter and said cathode connected to a second output of the full bridge inverter.

26. The power system of claim 21 further comprising a thermal overload protection circuit for sensing a temperature of the transformer and causing the controller to disable the full bridge inverter, wherein the controller is connected to a positive output of the DC to DC converter and is configured to selectively switch each of the first high side switch, second high side switch, first low side switch, and second low side switch between the on state and the off state as a function of a voltage of the positive output of the DC to DC converter, said voltage of the positive output of the DC to DC converter being relative to a negative output of the DC to DC converter.

27. The power system of claim 21 wherein the controller comprises a clock input for receiving a synchronization signal when the DC to DC converter is connected in parallel with a second DC to DC converter and selectively switching each of the first high side switch, second high side switch, first low side switch, and second low side switch between the on state and the off state as a function of the synchronization signal such that the switches are switched asynchronously with switches of the second DC to DC converter.

28. The power system of claim 21 wherein:
the controller selectively switches each of the first low side switch and the second low side switch between the on state and the off state at a fixed duty cycle; and
the controller adjusts a duty cycle of the first high side switch and a duty cycle of the second high side switch to control the voltage at a positive output of the DC to DC converter.

29. The power system of claim 21 wherein the controller selectively switches each of the first high side switch, the second high side switch, the first low side switch, and the second low side switch in a soft switching scheme.

30. The power system of claim 29 wherein the soft switching scheme is based on zero voltage switching.

* * * * *